United States Patent Office 3,014,786
Patented Dec. 26, 1961

3,014,786
PROCESS OF PRODUCING PYROPHOSPHORYL CHLORIDE
Margot Becke, nee Goehring, and Ekkehard Fluck, Heidelberg, Germany, assignors to Joh. A. Benckiser G.m.b.H., Chemische Fabrik, Ludwigshafen (Rhine), Germany, a corporation of Germany
No Drawing. Filed May 27, 1960, Ser. No. 32,145
Claims priority, application Germany June 5, 1959
5 Claims. (Cl. 23—203)

This invention relates to a process for producing diphosphoric acid tetrachloride, sometimes also called pyrophosphoryl chloride.

The pyrophosphoryl chloride has been known since 1871. It was prepared by A. Geuther and A. Michaelis (Jena, Ztg., vol. 7, page 103 (1871)); Berichte der Dtsch. Chem. Ges., vol. 4, page 766 (1871), by oxidation of phosphorus trichloride with nitrogen dioxide. This reaction was more recently described again by R. Klement and K. H. Wolf (Ztschr. anorganische allg. Chem., vol. 282, page 149 (1955)). However, the yield obtained in this process amounts to only about 10%. C. Oddo described another process for preparing pyrophosphoryl chloride by reacting phosphorus pentoxide with phosphorus pentachloride (Gaz. Chim. Ital., vol. 29, page 330 (1899)). A further method of preparing pyrophosphoryl chloride described by M. Viscontini and K. Ehrhardt (IUPAC-Colloquium, Munster, September 2–6, 1954, Verlag Chemie, Weinheim, 1954) is based on partial hydrolysis of phosphorus oxytrichloride (phosphoryl chloride). A process developed by M. Becke and J. Sambeth (Angew. Chem., vol. 69, page 640 (1957)), is based on the same principle. According to these methods, pyrophosphoryl chloride is obtained with yields of 10% and 15%. Still another process originates from G. N. Huntley (J. Chem. Soc., London, 1891, page 202) and was further developed by Grunze (Ztschr. anorg. allg. Chem., vol. 296, page 63 (1958)). According to this process phosphorus oxytrichloride is heated with phosphorus pentoxide in the bomb tube, and from the reaction mixture pyrophosphoryl chloride can be recovered by distillation in a yield of about 30%.

It is evident that no satisfactory method for the manufacture of pyrophosphoryl chloride exists.

It is one object of the present invention to provide a simple and advantageous process of producing pyrophosphoryl chloride in an almost quantitative yield which process overcomes all the disadvantages encountered when producing said compound according to known methods.

Other objects of the present invention and advantageous features thereof will become apparent as the description proceeds.

In principle the present invention is based on the surprising finding that dichloro phosphoric acid can readily be condensed with phosphorus oxychloride, i.e. phosphoryl chloride whereby hydrogen chloride is split off. Thereby, pyrophosphoryl chloride is formed in almost quantitative yield. The reaction proceeds according to the following equation:

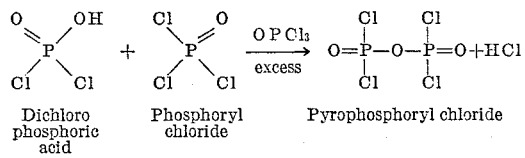

| Dichloro phosphoric acid | Phosphoryl chloride | Pyrophosphoryl chloride |

According to an advantageous embodiment of the present invention, it is not necessary to use phosphoryl chloride as the starting material. It was found that pyrophosphoryl chloride is also obtained by adding dichlorophosphoric acid to thionyl chloride. This reaction probably proceeds according to the following equation:

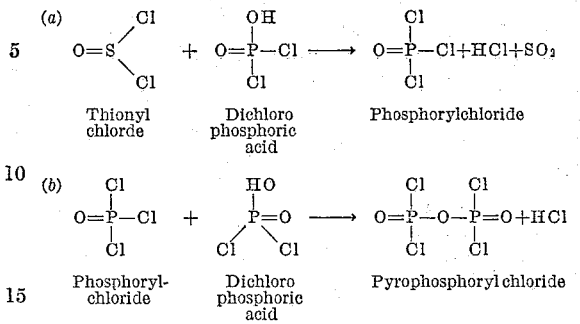

Apparently thereby first phosphoryl chloride is formed, which reacts in statu nascendi with dichloro phosphoric acid with the formation of pyrophosphoryl chloride.

Reaction sets in quite rapidly if boiling stones or other materials having a porous surface such as calcium chloride, pieces of sintered porous glass, of porous ceramic materials, pumice, and the like, are added to the reaction mixture. Thereby, apparently a kind of heterogeneous, catalytic reaction is involved.

The pyrophosphoryl chloride formed in the reaction can be separated from the phosphorylchloride used as the one reactant in known manner by fractional distillation. The phosphorylchloride thus recovered can be used for further conversion. By crude distillation of the reaction mixture, yields of about 80% of pyrophosphoryl chloride are obtained. This product is not pure yet, but is suitable for most reactions, in which pyrophosphoryl chloride is used as starting material. In order to obtain substantially pure pyrophosphoryl chloride, several fractional distillations are necessary. The yields are reduced by such procedures to about 60%.

Dichloro prosphoric acid used as the one reactant in the process according to the present invention is produced, for instance, as described by John R. Van Wazer and E. Fluck, J.A.C.S. 81, 6360 (1959).

The resulting pyrophosphoryl chloride is useful as reactant in the preparation, for instance, of diphosphoric acid tetrakis dimethylamide which is obtained therefrom as described by M. Goehring and K. Niedenzu, Zeitschrift Angewandte Chemie 68, 704 (1956), and thus is a valuable intermediate in the production of insecticides.

The following examples illustrate some specific embodiments of and best modes for carrying out the invention, without, however, limiting the same thereto.

*Example 1*

142 g. of about 93–95% dichloro phosphoric acid are dropwise introduced in the course of one hour into 1,500 g. of phosphoryl chloride which has been heated to 98° C., for instance, in a boiling water bath. Some vacuum boiling stones of the hereinabove mentioned type were added to the phosphoryl chloride. On addition of the dichloro phosphoric acid, the reaction sets in very quickly on said stones. During the dropwise introduction of the dichloro phosphoric acid a strong evolution of hydrogen chloride takes place. After the addition of dichloro phosphoric acid is completed, heating on the water bath is continued for about 10 minutes. Subsequently, excess phosphorylchloride is distilled off in a vacuum of about 2 mm. Hg over a column at a bath temperature between about 25° C. and about 30° C. 170 g. of a residue are thus obtained, from which by distillation in a high vacuum of 1–0.5 mm. Hg 80.6 g. easily crystallizable pyrophosphoryl chloride are recovered, provided care is taken that the residue to be distilled is exposed to heating for as little time as possible. Based on the amount of the dichloro phosphoric acid charged in the reaction, the yield is about 64%.

Example 2

185 g. of 93–95% dichloro phosphoric acid are introduced into 1,050 g. of phosphorylchloride which have been heated in a boiling water bath and to which a few grains of calcium chloride have been added. Subsequently, excess phosphorylchloride is distilled off in a vacuum of about 2 mm. Hg at a maximum bath temperature of 65° C., whereby 140 g. of residue remain. On distilling this residue in a molecular distillation device at an outside temperature of 80°–85° C., a distillate of 95 g. is obtained which consists of slightly impure pyrophosphoryl chloride. The yield amounts to 58%.

Example 3

125 g. of dichloro phosphoric acid are dropwise added within about one hour to 1,420 g. of phosphorylchloride which has been heated in a boiling water bath. A few vacuum boiling stones were initially added to the reaction mixture. As soon as the last drops of the dichloro phosphoric acid have been added, the reaction mixture is heated for about 10 more minutes. After cooling the reaction mixture, excess phosphorylchloride is distilled off in a vacuum of about 2 mm. Hg over a column. 95 g. of slightly impure pyrophosphoryl chloride are recovered from said residue by distillation in a molecular distillation apparatus.

Example 4

The amounts of reactants and the procedure are the same as described hereinabove in Example 1. However, no vacuum boiling stones are added. Heating after addition of the dichloro phosphoric acid is continued for 10 more minutes in order to complete the reaction. Separation of excess phosphoryl chloride and recovery of crystallizable pyrophosphoryl chloride are also carried out as described in Example 1. The yield of pyrophosphoryl chloride calculated for charged dichloro phosphoric acid is about 40%.

Example 5

170.8 g. of 93–95% dichloro phosphoric acid are added drop by drop to 420 cc. thionyl chloride which has been heated to 78° C. and to which there have been added some pieces of sintered porous glass. During said addition hydrogen chloride and sulfur dioxide are evolved and escape. Heating of the reaction mixture at 78° C. is then continued for about 10 minutes until evolution of hydrogen chloride and sulfur dioxide ceases.

Working up of the reaction mixture is then effected as described hereinabove in Example 1. The yield of substantially pure crystallizable pyrophosphoryl chloride is about 16%, calculated for the charged dichloro phosphoric acid.

It will be understood from the above that this invention is not limited to the specific conditions, steps, proportions and other details specifically described above and can be carried out with various modifications. For example, for one mole of the dichloro phosphoric acid, at least one mole, preferably 10–20 moles of phosphorylchloride and for one mole of dichloro phosphoric acid, at least one mole, preferably 10–20 moles of thionylchloride can be used. The reaction according to the present invention can be carried out at a temperature range between about 20° C. and about 120° C., the preferred temperatures being shown in the above working examples. The presence of the boiling stones or the like in the reaction mixture is not indispensable, but of considerable advantage, because the reaction starts much quicker in their presence. These and other modifications can be made without departing from the scope of the invention as defined in the appended claims.

What is claimed is:

1. In a process of producing pyrophosphoryl chloride, the steps which comprise contacting dichloro phosphoric acid with a compound selected from the group consisting of phosphorylchloride and thionylchloride at a temperature between about 20° C. and about 120° C. until formation of pyrophosphoryl chloride is completed, and recovering the resulting pyrophosphoryl chloride by fractional distillation from the reaction mixture.

2. In a process of producing pyrophosphoryl chloride, the steps which comprise contacting dichloro phosphoric acid with phosphorylchloride at a temperature between about 20° C. and about 120° C. until formation of pyrophosphoryl chloride is completed, and recovering the resulting pyrophosphoryl chloride by fractional distillation from the reaction mixture.

3. In a process of producing pyrophosphoryl chloride, the steps which comprise contacting dichloro phosphoric acid with thionylchloride at a temperature between about 20° C. and about 120° C. until formation of pyrophosphoryl chloride is completed, and recovering the resulting pyrophosphoryl chloride by fractional distillation from the reaction mixture.

4. In a process of producing pyrophosphoryl chloride, the steps which comprise contacting dichloro phosphoric acid with an excess of phosphorylchloride at a temperature between about 20° C. and about 120° C. until formation of pyrophosphoryl chloride is completed, and recovering the resulting pyrophosphoryl chloride by fractional distillation from the reaction mixture.

5. In a process of producing pyrophosphoryl chloride, the steps which comprise contacting dichloro phosphoric acid with a compound selected from the group consisting of phosphorylchloride and thionylchloride with the addition of pieces of a porous solid material unaffected by the reaction at a temperature between about 20° C. and about 120° C. until formation of pyrophosphoryl chloride is completed, and recovering the resulting pyrophosphoryl chloride by fractional distillation from the reaction mixture.

References Cited in the file of this patent

Mellor: "A Comprehensive Treatise on Inorganic and Theoretical Chemistry," vol. 8, 1928, pages 1005, 1026 and 1027, Longmans, Green and Co., N.Y.